(12) United States Patent
Lin

(10) Patent No.: US 12,053,113 B2
(45) Date of Patent: Aug. 6, 2024

(54) TEA LEAF CHAMBER THAT UTILIZES MAGNETIC MECHANISM

(71) Applicant: Yisheng Lin, Guangdong (CN)

(72) Inventor: Yisheng Lin, Guangdong (CN)

( * ) Notice: Subject to any disclaimer, the term of this patent is extended or adjusted under 35 U.S.C. 154(b) by 666 days.

(21) Appl. No.: 17/327,805

(22) Filed: May 24, 2021

(65) Prior Publication Data

US 2022/0031108 A1 Feb. 3, 2022

(30) Foreign Application Priority Data

Mar. 26, 2020 (CN) .......................... 202020400348.0

(51) Int. Cl.
*A47J 31/06* (2006.01)
*A47J 31/44* (2006.01)

(52) U.S. Cl.
CPC ....... *A47J 31/0642* (2013.01); *A47J 31/0615* (2013.01); *A47J 31/4407* (2013.01)

(58) Field of Classification Search
CPC ................ A47J 31/0642; A47J 31/0615; A47J 31/4407; A47J 31/20
USPC ........................................................... 99/295
See application file for complete search history.

(56) References Cited

U.S. PATENT DOCUMENTS

| | | | | |
|---|---|---|---|---|
| 3,724,359 A * | 4/1973 | Masters | ................... | A47J 31/20 99/281 |
| 4,327,632 A * | 5/1982 | Batty | ...................... | A47J 31/20 99/320 |
| 11,877,689 B1 * | 1/2024 | Lin | ...................... | A47J 31/0615 |
| 2010/0018403 A1 * | 1/2010 | Hoare | ..................... | A47J 31/20 99/323 |
| 2012/0097042 A1 * | 4/2012 | Lin | ......................... | A47J 31/20 99/297 |
| 2012/0260806 A1 * | 10/2012 | Rolfes | ..................... | A47J 31/38 99/295 |
| 2013/0220136 A1 * | 8/2013 | De Jong | ................. | A47J 31/20 99/285 |
| 2014/0150667 A1 * | 6/2014 | Liao | ..................... | A47J 31/446 99/323 |
| 2016/0113433 A1 * | 4/2016 | Hsu | ..................... | A47J 31/0615 99/283 |
| 2019/0290048 A1 * | 9/2019 | Albanese | .............. | A47J 31/521 |
| 2020/0154930 A1 * | 5/2020 | Rivera | ................. | A47J 31/4457 |
| 2020/0329898 A1 * | 10/2020 | Han | ......................... | A23N 1/02 |
| 2021/0330115 A1 * | 10/2021 | Yang | ...................... | A47J 31/20 |
| 2022/0087469 A1 * | 3/2022 | Huang | ................ | A47J 31/0615 |
| 2022/0095826 A1 * | 3/2022 | Li | ........................ | A47J 31/4457 |

(Continued)

*Primary Examiner* — Omar Flores Sanchez

(57) ABSTRACT

A tea leaf chamber, having a chamber body; wherein the chamber body has a hollow cover with an opening thereof facing downwardly, and a hollow seat with an opening thereof facing upwardly; the cover covers onto the seat; a cavity that accommodates tea leaves is defined between the cover and the seat after the cover covers onto the seat; an inner bottom side of the hollow cover away from the opening thereof is disposed with a counterweight; a bottom part of the counterweight is embedded with a magnet. The tea leaf chamber has a special shape, and by means of magnetic attraction and filter holes, it can hold tea leaves to brew tea. The tea leaf chamber is multifunctional, and the many ways to connect the cover and the seat enable convenient connection, reliable mounting and dismounting between the cover and the seat, and simple operation.

17 Claims, 13 Drawing Sheets

(56) References Cited

U.S. PATENT DOCUMENTS

2022/0369848 A1* 11/2022 Lin .................... A47J 31/4407
2024/0016321 A1* 1/2024 Horvath ............. A47J 31/0636

* cited by examiner

TEA LEAF CHAMBER THAT UTILIZES MAGNETIC MECHANISM

BACKGROUND OF THE INVENTION

The present invention relates to the technical field of tea brewing, and more specifically relates to a tea leaf chamber that utilizes magnetic mechanism.

Due to continuous social developments, more and more people are fond of the art of tea brewing which is beneficial to general wellness and the quality of life. A tea leaf chamber is a component often used during tea brewing. Tea leaf chamber refers to the component which receives and stores tea leaves. Conventional tea leaf chambers are generally cylindrical in shape without much variation in their shapes as well as functions. They are only used to accommodate tea leaves and lack other functions. Users can neither discover any interesting elements in them. Also, the reliability of mounting and dismounting a tea leaf chamber of the prior art is low, and it is complicated and inconvenient to operate a prior art tea leaf chamber.

BRIEF SUMMARY OF THE INVENTION

In view of the aforesaid disadvantages now present in the prior art, including the lack of variations of shapes and functions, the lack of interesting elements, poor reliability of mounting and dismounting, as well as complicated operation, the present invention proposes a kind of tea leaf chamber utilizing magnetic mechanism.

To solve the above technical problems, the present invention provides the following technical solutions:

A tea leaf chamber, comprising a chamber body; the chamber body comprises a hollow cover with an opening thereof facing downwardly, and a hollow seat with an opening thereof facing upwardly; the cover covers onto the seat; a cavity adapted to accommodate tea leaves is defined between the cover and the seat after the cover covers onto the seat; an inner bottom side of the hollow cover away from the opening thereof is disposed with a counterweight; a bottom part of the counterweight is embedded with a magnet.

Further, an outer surface of the seat is provided with an annular position limiting groove adapted to engage and fix in position with a cup lid.

Further, a bottom side of the seat is provided with a second opening facing downwardly; an inner side surface of the second opening of the seat is provided with an annular locking groove; a bottom side of the counterweight is connected with a buffering rubber that fits with the annular locking groove and seals the second opening of the seat.

Further, an upper part of the magnet is embedded and fixed to the bottom part of the counterweight; a lower part of the magnet is embedded and fixed to the buffering rubber.

Further, the counterweight and the magnet are fixed inside the seat by rubber packaging.

Further, the tea leaf chamber further comprises a magnetic shell that receives and fixes the magnet and the counterweight is provided at a bottom part of the seat; the magnetic shell is divided into an upper magnetic shell and a lower magnetic shell; the upper magnetic shell is stacked onto the lower magnetic shell and fixed to the lower magnetic shell; a magnet mounting portion that receives the magnet and a counterweight mounting portion that has an annular shape are provided inside the magnetic shell; the counterweight has an annular shape correspondingly.

Further, opposing surfaces of the upper magnetic shell and the lower magnetic shell are each provided with a magnet groove and an annular counterweight groove surrounding an outer periphery of the magnet groove; after the upper magnetic shell and the lower magnetic shell are connected with each other, the magnet groove of the upper magnetic shell and the magnet groove of the lower magnetic shell are connected with each other to define the magnet mounting portion, and the annular counterweight groove of the upper magnetic shell and the annular counterweight groove of the lower magnetic shell are connected with each other to define the counterweight mounting portion.

Further, the upper magnetic shell is disposed interior to a bottom side wall of the seat; the lower magnetic shell is disposed exterior to a bottom side wall of the seat; an outer side surface of the lower magnetic shell is provided with the annular position limiting groove.

Further, an upper end and a lower end of the chamber body are each provided with a silicone piece to achieve shock absorption effect.

Further, the cover and the seat are connected to each other by screw threads.

Further, mutual rotation between the cover and the seat allows the cover and the seat to be buckled together.

Further, buckling blocks are provided along an outer periphery of the opening of the cover; and buckling grooves corresponding to the buckling blocks are provided on an inner periphery of the opening of the seat such that the buckling blocks are buckled to the corresponding buckling grooves.

Further, a connecting portion between the counterweight and the seat is provided with a silicone seal ring.

Further, the cover and the seat are both provided with filter holes.

Further, the magnet and the buffering rubber are mutually fixed with each other by rubber packaging.

Further, the seat and the counterweight are formed as an integral structure.

Further, the chamber body has a spherical or cylindrical shape.

Compared with the prior art, the present invention has the following beneficial effects:

The present invention discloses a tea leaf chamber that utilizes magnetic mechanism. The tea leaf chamber may comprise a cover, a seat, an annular position limiting groove, a counterweight, a buffering rubber, a magnet, a silicone seal ring, a cavity, filter holes, annular locking groove, buckling grooves, and buckling blocks. The tea leaf chamber according to the present invention has a special shape. By means of magnetic attraction and the provision of filter holes, the tea leaf chamber can be immersed into tea soup to achieve tea brewing. The present invention can have multiple functions. Further, there are various ways to connect the cover and the seat which all facilitate convenient connection, high reliability of mounting and dismounting between the cover and the seat, and simple operation.

DETAILED DESCRIPTION OF THE INVENTION

Embodiment 1

Figure 1:
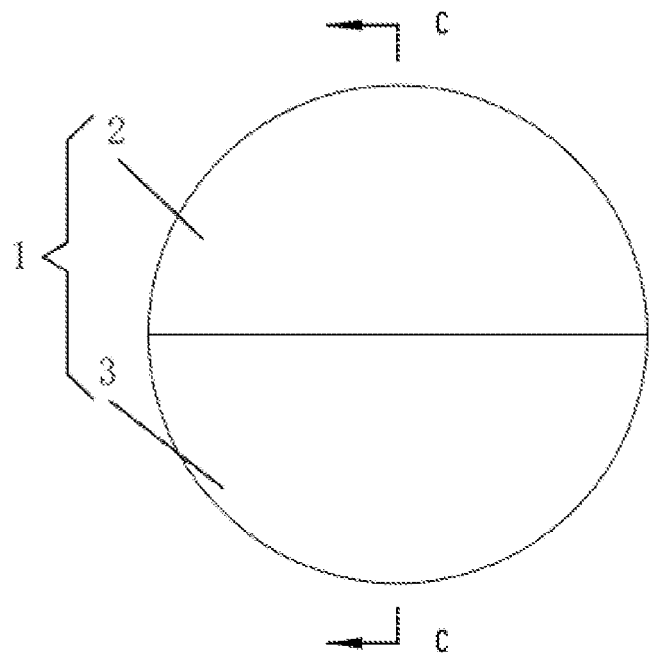
FIG. 1 is a front view of the present invention according to embodiment 1.
Figure 2:
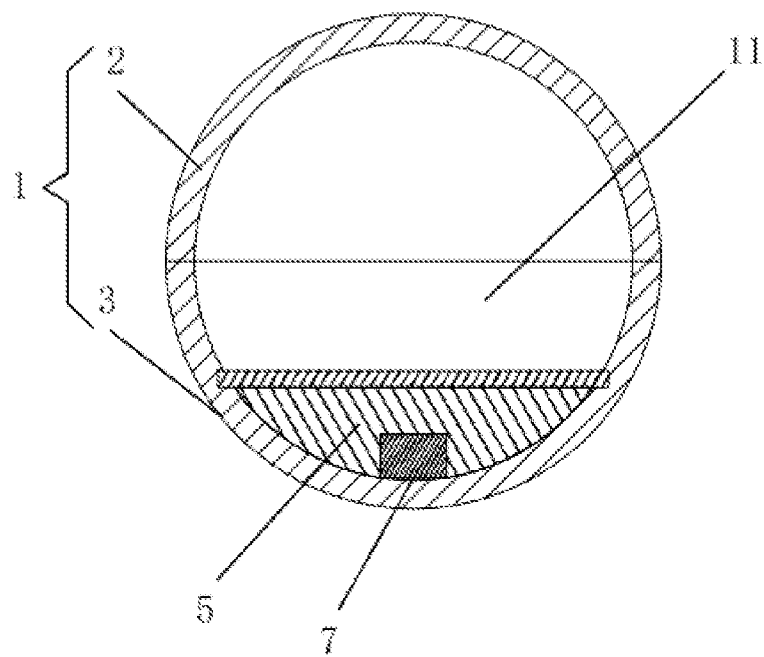
FIG. 2 is a sectional view along C-C of FIG. 1.
Figure 3:
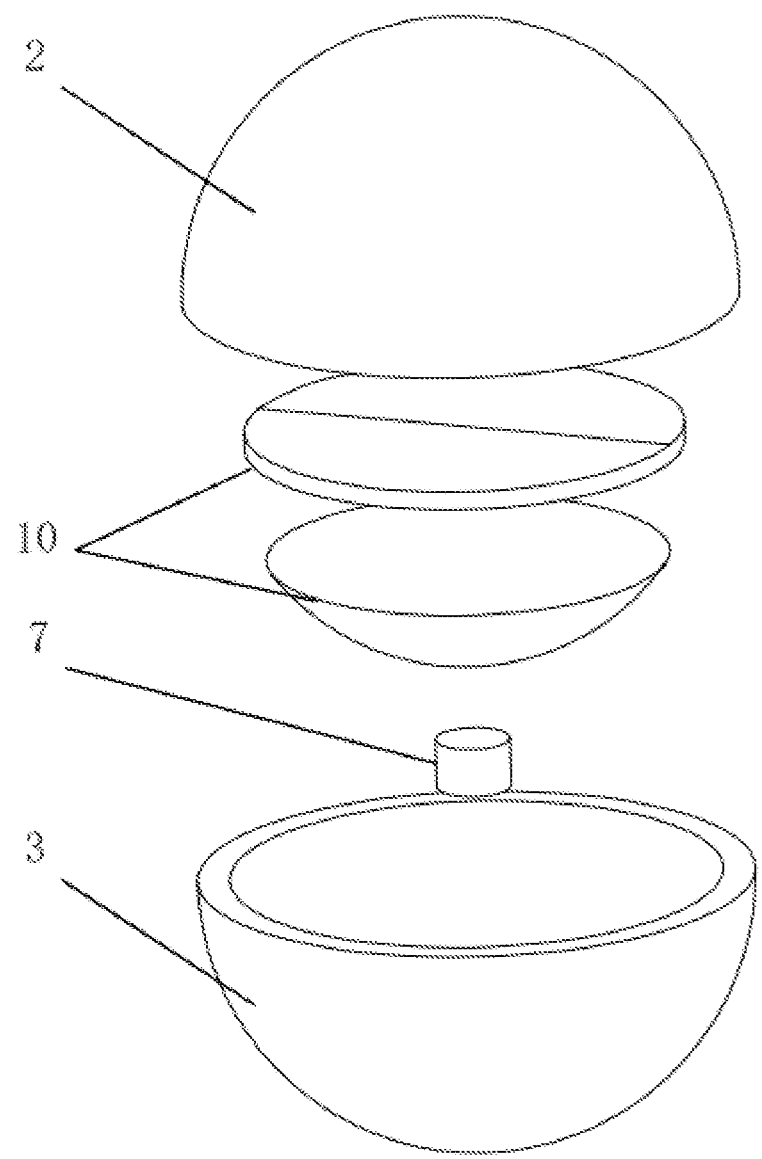
FIG. 3 is a perspective exploded view of the present invention according to embodiment 1.
Figure 4:
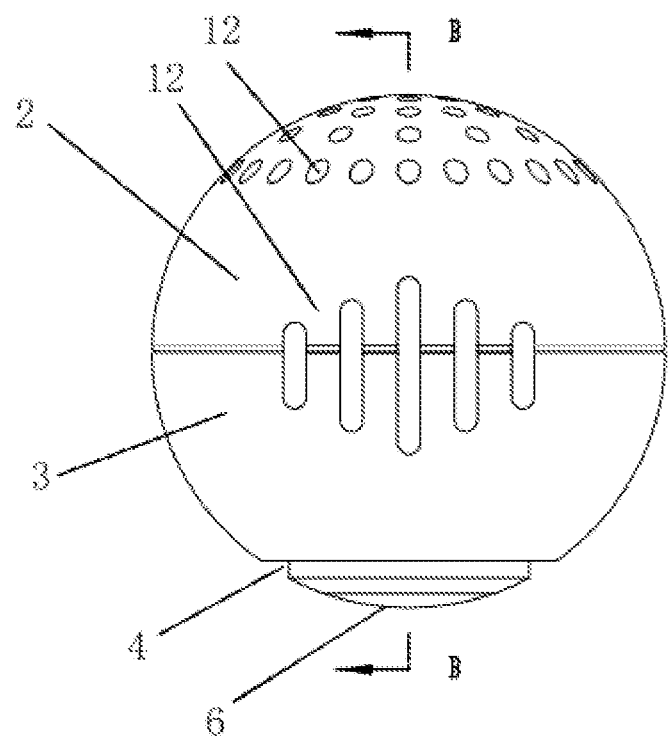
FIG. 4 is a front view of the present invention according to embodiment 2.
Figure 5:
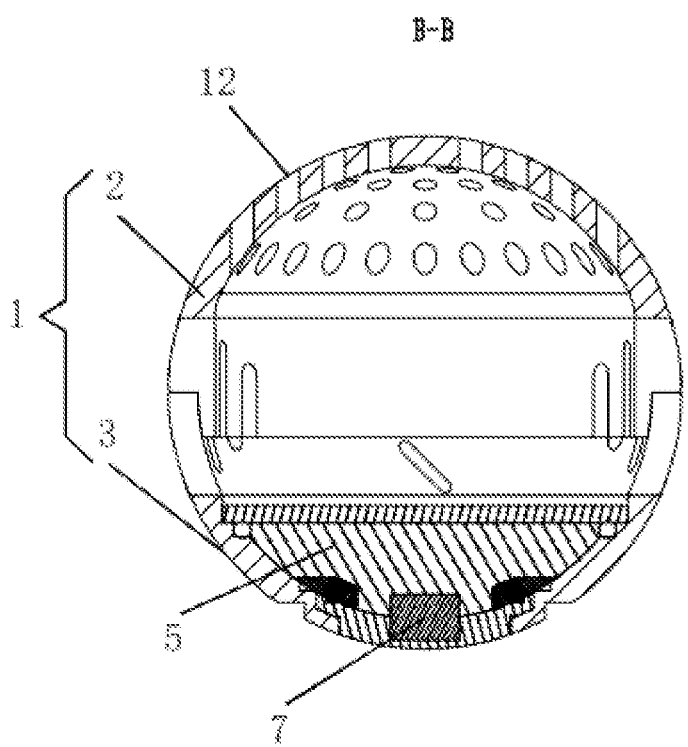
FIG. 5 is a sectional view along B-B of FIG. 4.

With reference to FIG. 1 to FIG. 3, a tea leaf chamber, comprising a chamber body 1, which is in a spherical shape; the chamber body 1 comprises a hollow semi-spherical cover 2 with an opening thereof facing downwardly, and a hollow semi-spherical seat 3 with an opening thereof facing upwardly; the cover 2 covers onto the seat 3; a cavity 11 that accommodates tea leaves is defined between the cover 2 and the seat 3 after the cover 2 covers onto the seat 3; an inner bottom side of the hollow cover 2 away from the opening thereof is disposed with a counterweight 5; a bottom part of the counterweight 5 is embedded with a magnet 7.

According to the embodiment, the cover 2 covers the seat 3, and the counterweight 5 is disposed inside the seat 3 to create the effect like a tumbler toy. During use, tea leaves can be placed inside the cavity 11 to provide good sealing and storage effects. Also, a tumbler toy resembling tea leaf chamber can be somehow interesting. Therefore, the present invention is obviously distinguishable from a prior art tea leaf chamber. The use of covering structure of the cover 2 covering the seat 3, opening and closing of the tea leaf chamber is quicker and easier to facilitate tea leaves to be placed inside or taken out.

Embodiment 2

With reference to FIG. 4 to FIG. 10, a tea leaf chamber is provided, which can be immersed into tea soup to achieve tea brewing, and which is adapted to be used with tea cup and cup lid having magnetic effect. Embodiment 2 is different from embodiment 1 in that, an outer surface of the seat 3 is provided with an annular position limiting groove 4; a bottom side of the seat 3 is provided with a second opening 33 facing downwardly; an inner side surface of the second opening 33 of the seat 3 is provided with an annular locking groove 13; a bottom side of the counterweight 5 is connected with a buffering rubber 6 that fits with the annular locking groove 13 and seals the second opening 33 of the seat 3. Due to the annular position limiting groove 4 and the magnet 7, the tea leaf chamber is provided with magnetic effect. With the provision of an annular fixing ring corresponding to the annular position limiting groove 4 on a tea cup or cup lid also having magnetic effect, magnetic attraction and thus the resulting positioning effect can be achieved. An upper part of the magnet 7 is embedded and fixed to the bottom part of the counterweight 5; a lower part of the magnet 7 is embedded and fixed to the buffering rubber 6. It should be understood that, the magnet 7 and the buffering rubber 6 can be mutually fixed by rubber packaging; the cover 2 and the seat 3 are both provided with filter holes 12.

Figure 7:
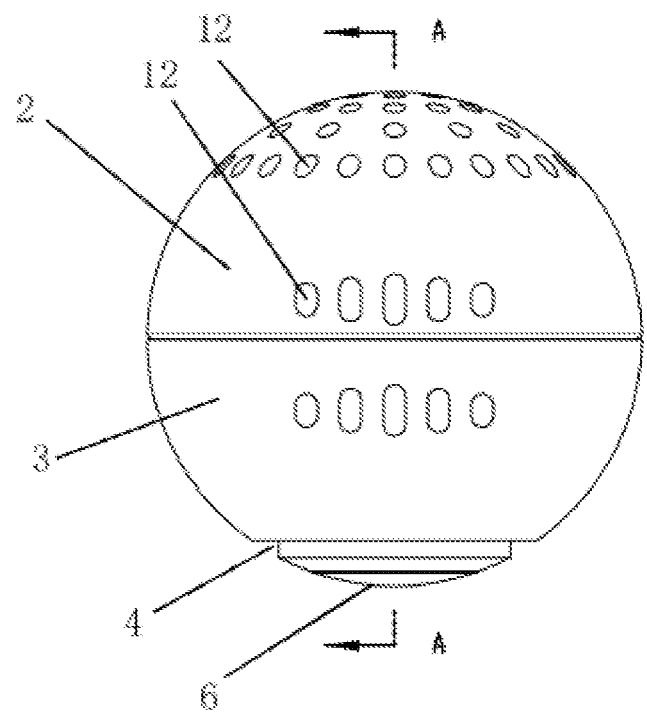
FIG. 7 is a front view of the present invention according to embodiment 3.
Figure 8:
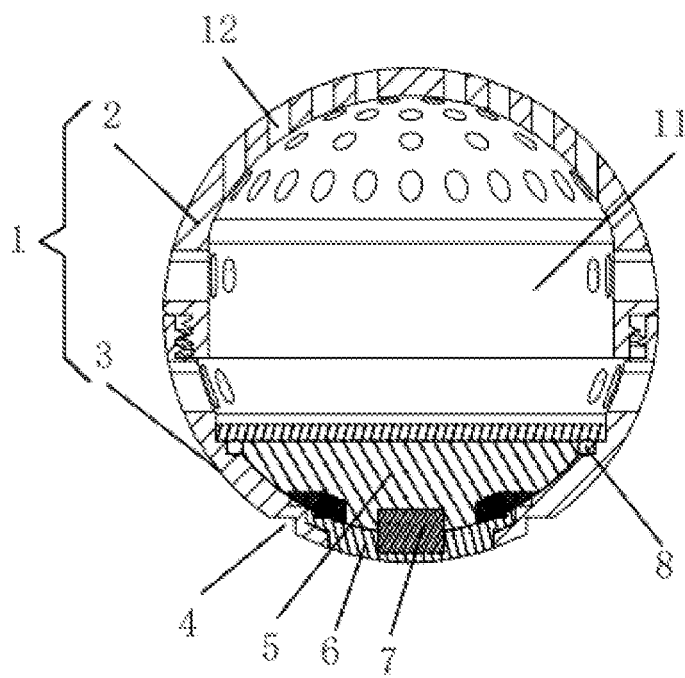
FIG. 8 is a sectional view along A-A of FIG. 7.
Figure 9:
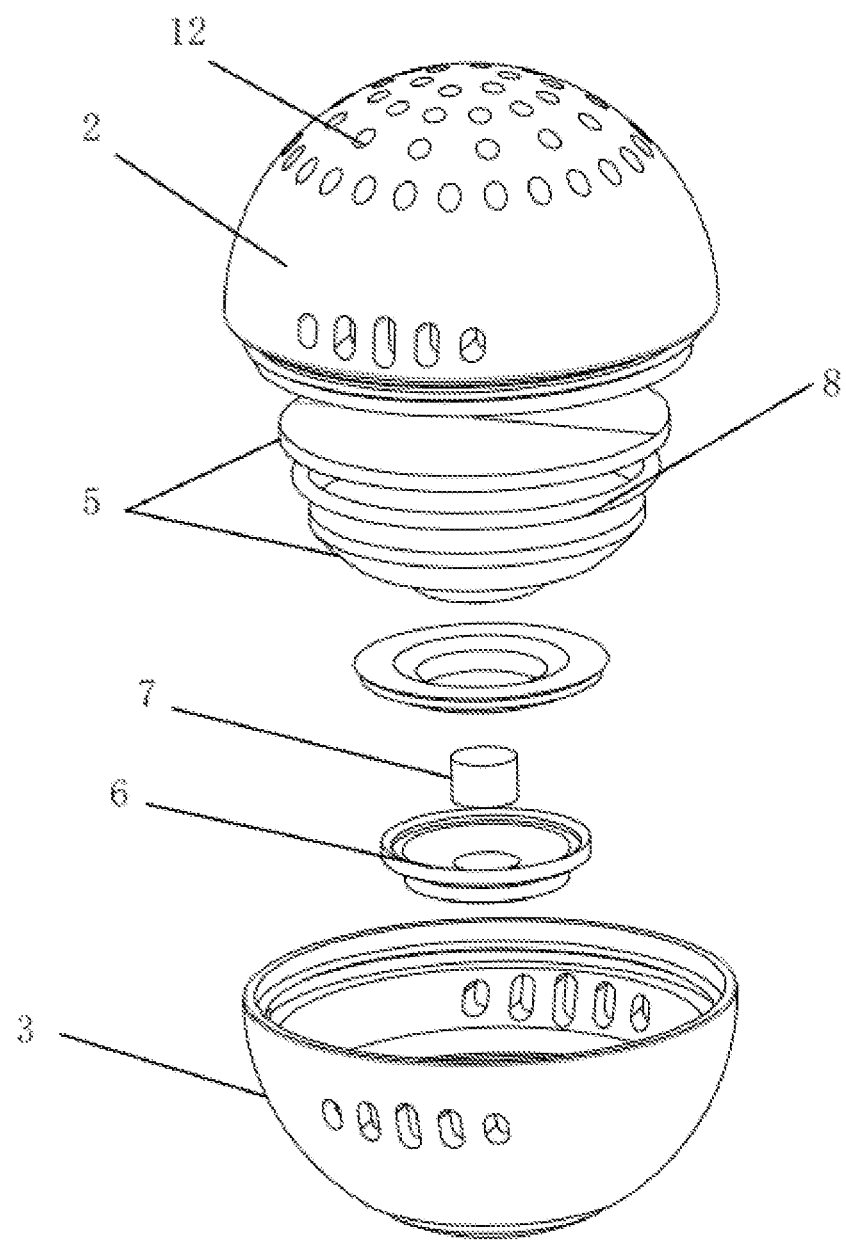
FIG. 9 is a perspective exploded view of the present invention according to embodiment 3.
Figure 10:
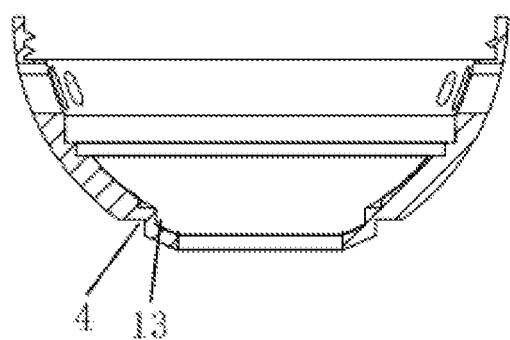
FIG. 10 is a schematic structural view of the seat in embodiments 2 and 3 of the present invention.

Specifically, with reference to FIG. 7 to FIG. 9, the cover 2 and the seat 3 are connected to each other by screw threads.

Embodiment 3

Figure 6:
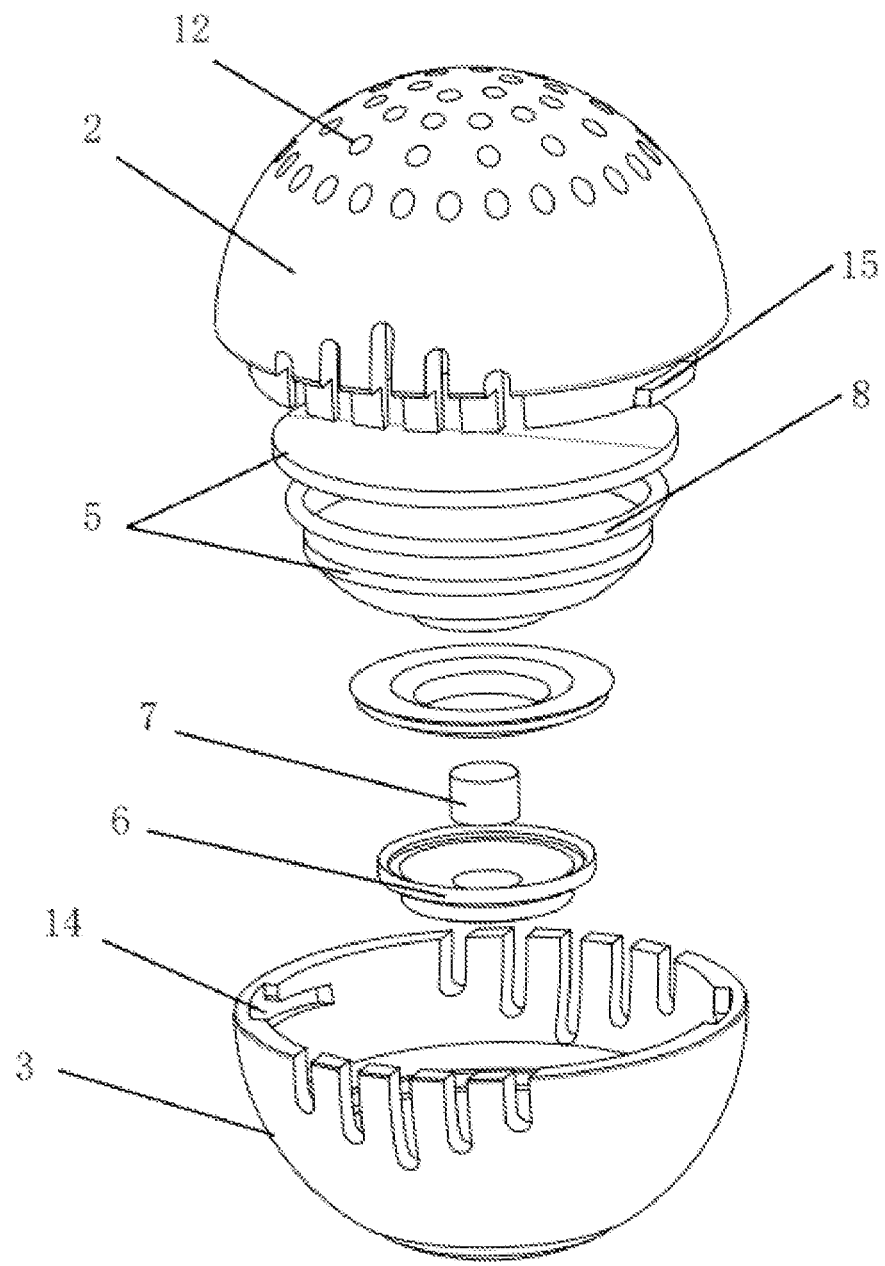
FIG. 6 is a perspective exploded view of the present invention according to embodiment 2.

Embodiment 3 is different from embodiment 2 in that, with reference to FIG. 6, a different way of connecting the cover 2 and the seat 3 is proposed, wherein the cover 2 and the seat 3 are buckled achieved by mutual rotation between the cover 2 and the seat 3. Specifically, buckling blocks 15 are provided along an outer periphery of the opening of the cover 2; and buckling grooves 14 corresponding to the buckling blocks 15 are provided on an inner periphery of the opening of the seat 3. Further, both the cover 2 and the seat 3 are also provided with filter holes 12.

Embodiment 4

Figure 11:
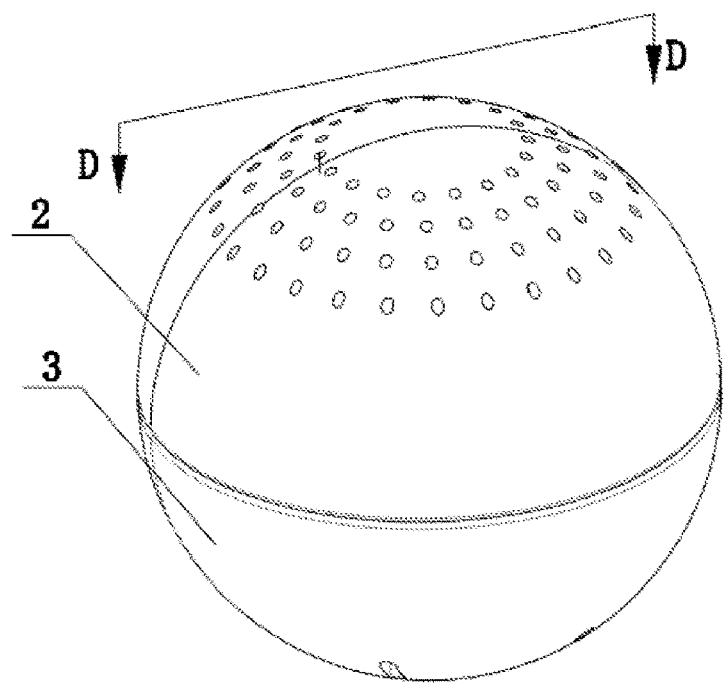
FIG. 11 is a structural view of the present invention according to embodiment 4.
Figure 12:
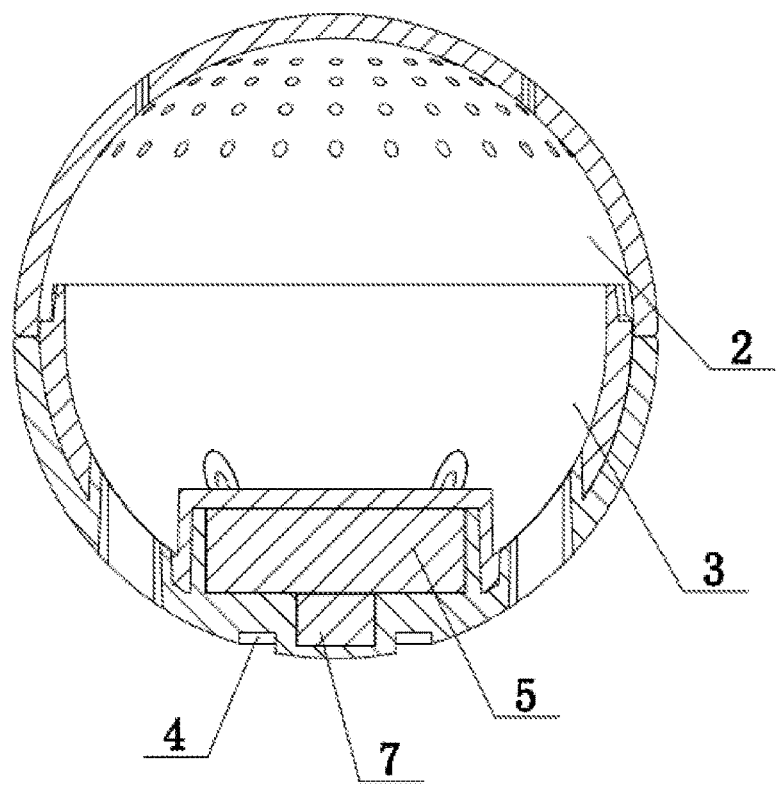
FIG. 12 is a sectional view along D-D of FIG. 11.
Figure 13:
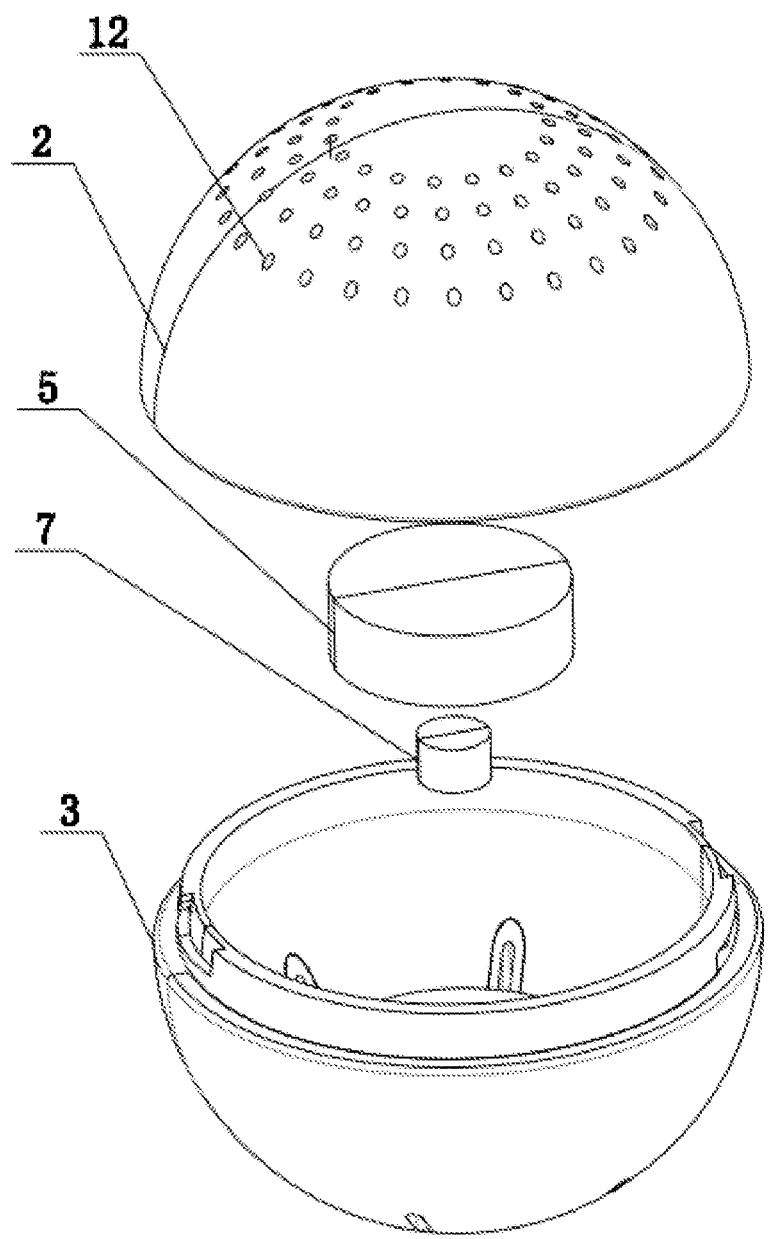
FIG. 13 is a perspective exploded view of the present invention according to embodiment 4.

Embodiment 4 is different from embodiment 2 in that, with reference to FIG. 11 to FIG. 13, the tea leaf chamber has a spherical shape, and the counterweight 5 has a cake shape. Specifically, the counterweight 5 and the magnet 7 are directly fixed inside the seat 3 through rubber packaging. As such, components like buffering rubber may not be required accordingly.

Embodiment 5

Figure 14:
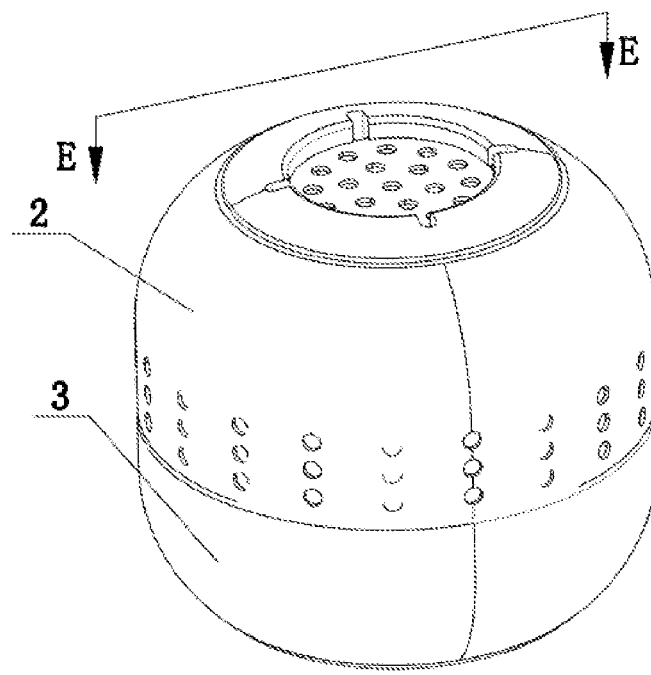
FIG. 14 is a structural view of the present invention according to embodiment 5.
Figure 15:
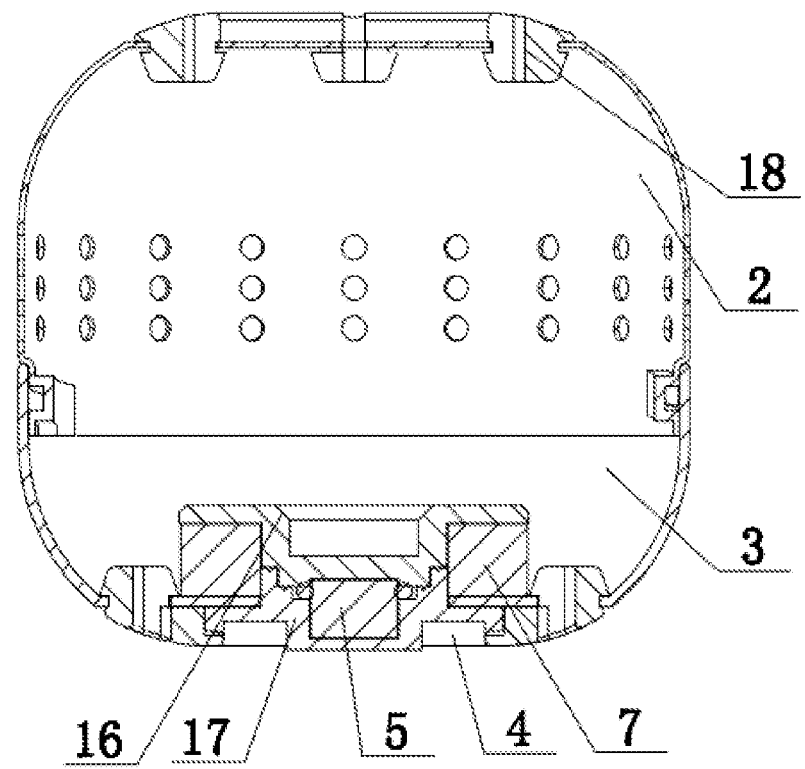
FIG. 15 is a sectional view along E-E of FIG. 14.
Figure 16:
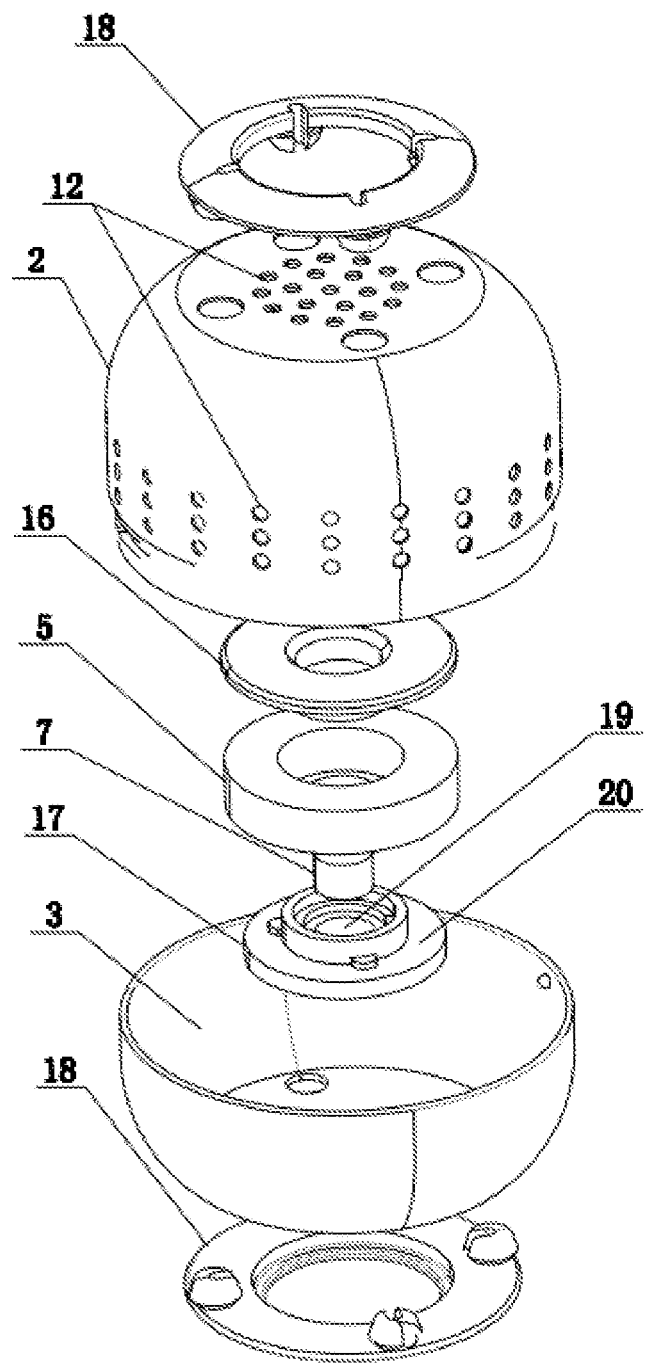
FIG. 16 is a perspective exploded view of the present invention according to embodiment 5.

Embodiment 5 is different from embodiment 4 in that, with reference to FIG. 14 to FIG. 16, the tea leaf chamber has a shape of a cylinder; a magnetic shell that receives and fixes the magnet 7 and the counterweight 5 is provided at the bottom part of the seat 3; the magnetic shell is divided into an upper magnetic shell 16 and a lower magnetic shell 17; the upper magnetic shell 16 is stacked onto the lower magnetic shell 17 and then fixed to the lower magnetic shell 17, wherein fixation between the upper magnetic shell 16 and the lower magnetic shell 17 is achieved by but not limited to ultrasonic connection; a magnet mounting portion that receives the magnet 7 and a counterweight mounting portion that has an annular shape are provided inside the magnetic shell; opposing surfaces of the upper magnetic shell 16 and the lower magnetic shell 17 are each provided with a magnet groove 19 and an annular counterweight groove 20 surrounding an outer periphery of the magnet groove 19; after the upper magnetic shell 16 and the lower magnetic shell 17 are connected with each other, the magnet groove 19 of the upper magnetic shell 16 and the magnet groove 19 of the lower magnetic shell 17 are connected with each other to define the magnet mounting portion, and the annular counterweight groove 20 of the upper magnetic shell 16 and the annular counterweight groove 20 of the lower magnetic shell 17 are connected with each other to define the counterweight mounting portion. The upper magnetic shell 16 is disposed interior to a bottom side wall of the seat 3; the lower magnetic shell 17 is disposed exterior to a bottom side wall of the seat 3; an outer side surface of the lower magnetic shell 17 is provided with the annular position limiting groove 4; an upper end and a lower end of the chamber body 1 are each provided with a silicone piece 18 to enhance shock absorption effect of the tea leaf chamber when the tea leaf chamber moves inside the tea cup. Accordingly, in the present embodiment, the counterweight 5 will have an annular shape as well. The present embodiment provides a different kind of mounting structure for the counterweight and the magnet compared with other embodiments.

Embodiment 6

Figure 17:
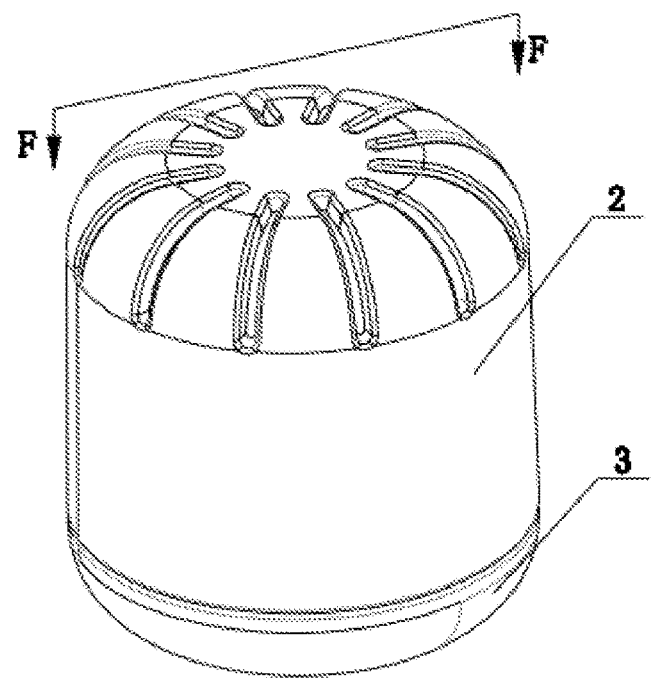
FIG. 17 is structural view of the present invention according to embodiment 6.
Figure 18:
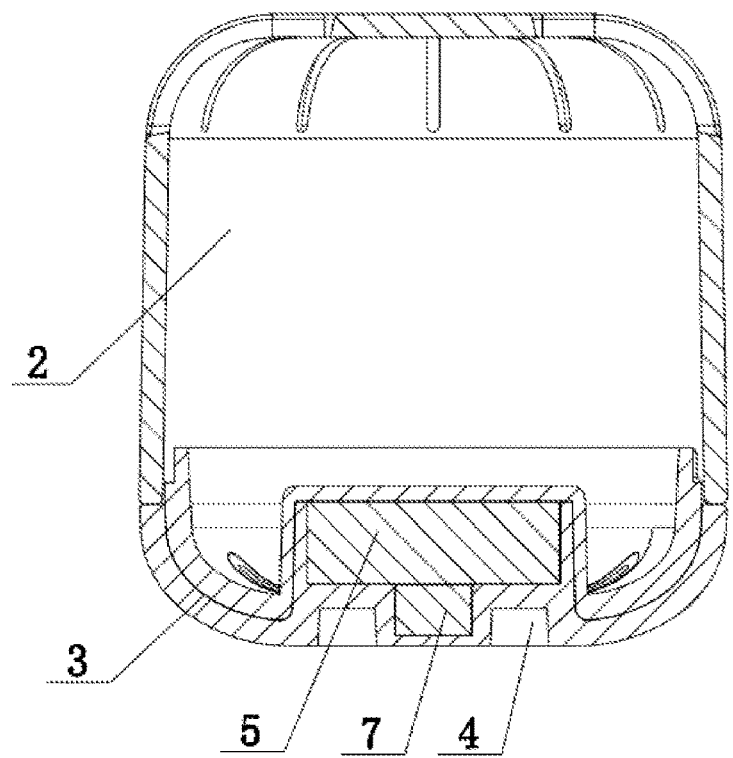
FIG. 18 is a sectional view along F-F of FIG. 17.
Figure 19:
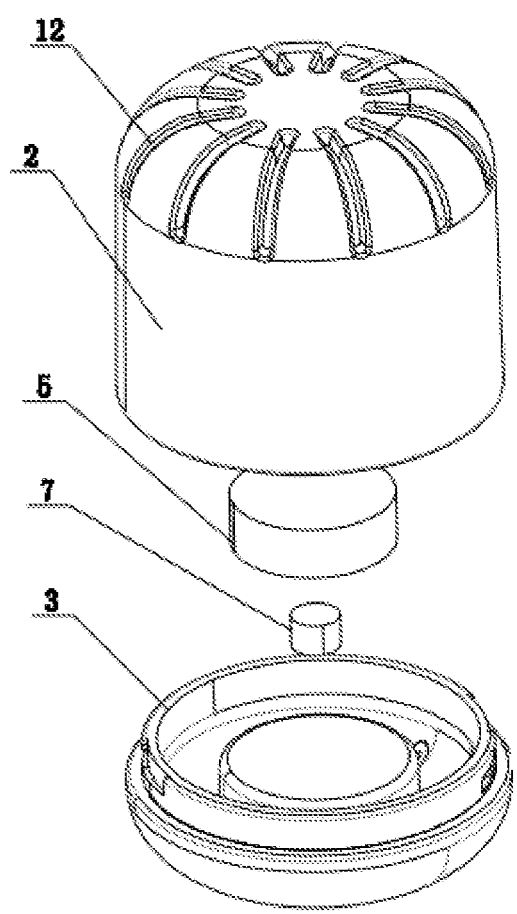
FIG. 19 is a perspective exploded view of the present invention according to embodiment 6.

Embodiment 6 is different from embodiment 5 in that, with reference to FIG. 17 to FIG. 19, the tea leaf chamber is an elongated cylinder, and the counterweight 5 and the magnet 7 are mounted according to the mounting structures disclosed in embodiment 4. As shown in the figures, the shape of the chamber body 1 can be adjusted during production according to the practical needs. For example, a length of the chamber body 1 may increase, and a length ratio and a width ratio etc between the cover 2 and the seat 3 can also be adjusted.

It should be understood that, the annular position limiting groove 4 as disclosed by embodiment 2 has a different structure in embodiments 4-6. In spite of this, the annular position limiting groove 4 in these embodiments has a purpose in common, that is, to engage and fix in position with a corresponding cup lid. In other words, a bottom side of the cup lid should be provided with a mechanism corresponding to the annular position limiting groove 4 so as to be engaged with and fixed in position with respect to the annular position limiting groove 4. In actual use, a center part of the cup lid is provided with a neodymium magnet that may magnetically attract the magnet 7 inside the tea leaf chamber.

It should be understood that, throughout embodiments 1 to 6, the counterweight 5 is provided inside the seat 3 of the chamber body 1. There are several purposes for providing the counterweight 5: Firstly, when the chamber body 1 has a spherical shape, the counterweight 5 can lower a center of gravity of the tea leaf chamber so as to achieve the effect of a tumbler toy, such that when the chamber body 1 stands independently on a table surface, the seat 3 will always be positioned below the cover 2 like a tumbler toy, and when the chamber body 1 has a cylindrical shape, the counterweight 5 can also lower the center of gravity of the tea leaf chamber so that it may not easily fall down on the table surface; secondly, when the tea leaf chamber 1 is used for tea brewing inside a tea cup with a diameter larger than the tea leaf chamber 1, the tea leaf chamber 1 will always have the seat 3 facing downwardly when the chamber body 1 sinks into the tea cup; thirdly, the counterweight 5 is provided to overcome buoyancy such that the tea leaf chamber 1 can quickly sink inside the tea cup.

It should be understood that, the filter holes 12 can have a circular shape, or can have a square, a rhombus, or an elongated shape; the chamber body 1 can be made of materials such as stainless steel or rigid plastics.

It should be understood that, a connecting portion between the counterweight 5 and the seat 3 is provided with a silicone seal ring 8 so as to attain better sealing effect.

It should be understood that, the buffering rubber 6 can be made of silica gel to attain better sealing effect and better resilience.

It should be understood that, the seat 3 and the counterweight 5 may be formed as an integral structure. Experiments show that the same technical effects can be achieved with the seat 3 and the counterweight 5 formed as an integral structure, while forming the seat 3 and the counterweight 5 as an integral structure can in fact reduce the quantity of molds required during production and thus lowering the production costs.

The present invention discloses a tea leaf chamber that utilizes magnetic mechanism. The tea leaf chamber as disclosed in the various embodiments may comprise a cover 2, a seat 3, an annular position limiting groove 4, a counterweight 5, a buffering rubber 6, a magnet 7, a silicone seal ring 8, a cavity 11, filter holes 12, annular locking groove 13, buckling grooves 14, and buckling blocks 15. The tea leaf chamber according to the present invention has a special shape. By means of magnetic attraction and the provision of filter holes, the tea leaf chamber can be immersed into tea soup to achieve tea brewing. The present invention can have multiple functions. Further, there are various ways to connect the cover 2 and the seat 3 which all facilitate convenient connection, high reliability of mounting and dismounting between the cover 2 and the seat 3, and simple operation.

What is claimed is:

1. A tea leaf chamber, comprising a chamber body; wherein the chamber body comprises a hollow cover with an opening thereof facing downwardly, and a hollow seat with an opening thereof facing upwardly; the cover covers onto the seat; a cavity adapted to accommodate tea leaves is defined between the cover and the seat after the cover covers onto the seat; an inner bottom side of the hollow cover away from the opening thereof is disposed with a counterweight; a bottom part of the counterweight is embedded with a magnet.

2. The tea leaf chamber of claim 1, wherein an outer surface of the seat is provided with an annular position limiting groove adapted to engage and fix in position with a cup lid.

3. The tea leaf chamber of claim 2, wherein a bottom side of the seat is provided with a second opening facing downwardly; an inner side surface of the second opening of the seat is provided with an annular locking groove; a bottom side of the counterweight is connected with a buffering rubber that fits with the annular locking groove and seals the second opening of the seat.

4. The tea leaf chamber of claim 3, wherein an upper part of the magnet is embedded and fixed to the bottom part of the counterweight; a lower part of the magnet is embedded and fixed to the buffering rubber.

5. The tea leaf chamber of claim 2, wherein the counterweight and the magnet are fixed inside the seat by rubber packaging.

6. The tea leaf chamber of claim 2, wherein the tea leaf chamber further comprises a magnetic shell at a bottom part of the seat; the magnetic shell receives and fixes the magnet and the counterweight; the magnetic shell is divided into an upper magnetic shell and a lower magnetic shell; the upper magnetic shell is stacked onto the lower magnetic shell and fixed to the lower magnetic shell; a magnet mounting portion that receives the magnet and a counterweight mounting portion that has an annular shape are provided inside the magnetic shell; the counterweight has an annular shape correspondingly.

7. The tea leaf chamber of claim 6, wherein opposing surfaces of the upper magnetic shell and the lower magnetic shell are each provided with a magnet groove and an annular counterweight groove surrounding an outer periphery of the magnet groove; after the upper magnetic shell and the lower magnetic shell are connected with each other, the magnet groove of the upper magnetic shell and the magnet groove of the lower magnetic shell are connected with each other to define the magnet mounting portion, and the annular counterweight groove of the upper magnetic shell and the annular counterweight groove of the lower magnetic shell are connected with each other to define the counterweight mounting portion.

8. The tea leaf chamber of claim 6, wherein the upper magnetic shell is disposed interior to a bottom side wall of the seat; the lower magnetic shell, is disposed exterior to a bottom side wall of the seat; an outer side surface of the lower magnetic shell is provided with the annular position limiting groove.

9. The tea leaf chamber of claim 6, wherein an upper end and a lower end of the chamber body are each provided with a silicone piece to achieve shock absorption effect.

10. The tea leaf chamber of claim 4, wherein the cover and the seat are connected to each other by screw threads.

11. The tea leaf chamber of claim 4, wherein mutual rotation between the cover and the seat allows the cover and the seat to be buckled together.

12. The tea leaf chamber of claim 11, wherein buckling blocks are provided along an outer periphery of the opening of the cover; and buckling grooves corresponding to the buckling blocks are provided on an inner periphery of the opening of the seat such that the buckling blocks are buckled to the corresponding buckling grooves.

13. The tea leaf chamber of claim 4, wherein a connecting portion between the counterweight and the seat is provided with a silicone seal ring.

14. The tea leaf chamber of claim 4, wherein the cover and the seat are both provided with filter holes.

15. The tea leaf chamber of claim 4, wherein the magnet and the buffering rubber are mutually fixed with each other by rubber packaging.

16. The tea leaf chamber of claim 4, wherein the seat and the counterweight are formed as an integral structure.

17. The tea leaf chamber of claim 1, wherein the chamber body has a spherical or cylindrical shape.

* * * * *